July 25, 1961 C. E. SOUSER 2,993,582
CONVEYOR SYSTEM
Filed Feb. 28, 1957
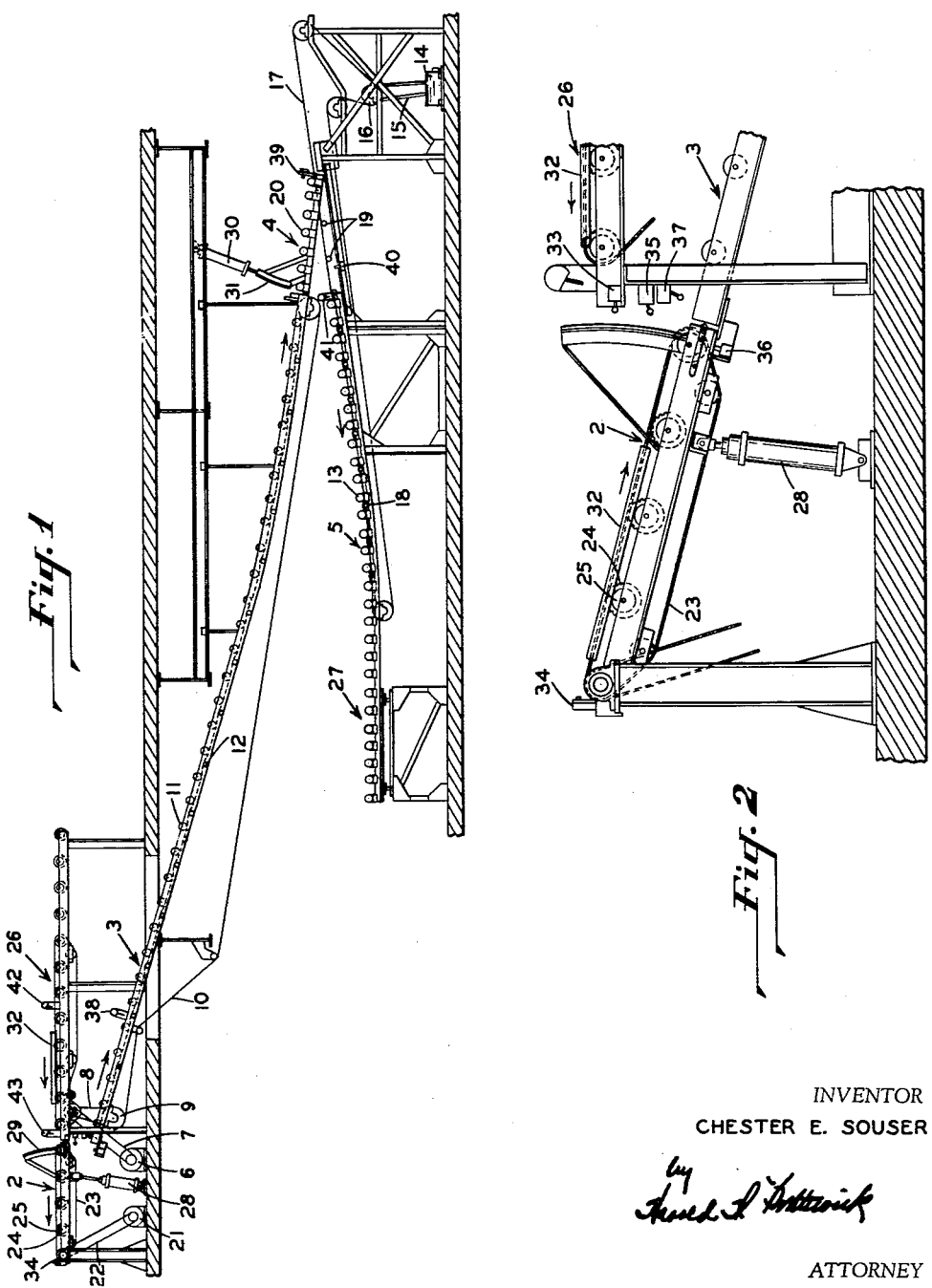
INVENTOR
CHESTER E. SOUSER
ATTORNEY United States Patent Office 2,993,582
Patented July 25, 1961

2,993,582
CONVEYOR SYSTEM
Chester E. Souser, Manheim Township, Lancaster County, Pa., assignor to Armstrong Cork Company, Lancaster, Pa., a corporation of Pennsylvania
Filed Feb. 28, 1957, Ser. No. 643,034
2 Claims. (Cl. 198—21)

This invention relates to a conveyor system. It is concerned more particularly with a conveyor system for moving articles from one elevation to a lower one such as required in delivery of articles made on one floor to a work area on a floor below.

The invention will be described as it relates to a conveyor system for delivering boards or blanks of acoustical material about 51" x 51" x 1⅛" thick and weighing in the order of 40 pounds each. The boards may be delivered to the conveying system from a dielectric drier and may be conveyed to a floor below for surface finishing, painting, trimming, etc.

In the accompanying drawing:

FIGURE 1 is a diagrammatic view, illustrating the system of the invention; and

FIGURE 2 is a similar view to a somewhat larger scale of a portion of the system shown in FIGURE 1 which illustrates one tilting conveyor section and control equipment therefor. In this view some of the driving equipment and other elements have been omitted for clarity of illustration.

According to the invention, a tiltable conveyor section is provided which is movable from an article-receiving position to an inclined article-delivering position. An off-bearing conveyor section is positioned in alignment with said tilting conveyor section when it is disposed in its tilted article-delivering position. Means, such as a motor and speed reducer, are provided for driving the tiltable conveyor to infeed an article into position thereon and to hold it against movement therealong during tilting movement of the conveyor section and for driving the tiltable conveyor in an opposite direction to outfeed the article from the conveyor upon movement of the conveyor section to an inclined position, at which position it is in alignment with the off-bearing conveyor section.

Another important feature of the invention is a new combination including a tiltable conveyor section pivoted to move from an article-receiving position to an inclined article-delivery position in alignment with an off-bearing conveyor section, together with a drive arrangement which drives the off-bearing conveyor section continuously and also drives the tiltable conveyor section when it is in its tilted article-delivery position.

An embodiment of the invention is shown in the drawing. This is illustrative of the system of the invention and, as noted above, is designed to convey boards from an uper floor level to the floor below.

The conveyor system includes a tiltable conveyor section 2 pivoted to move from an article-receiving position, as shown in FIGURE 1, to an inclined article-delivery position in alignment with an inclined off-bearing conveyor section 3, as shown in FIGURE 2. A second tiltable conveyor section 4 is provided which is pivoted to move from an article-receiving position in alignment with conveyor section 3, as shown in FIGURE 1, to an inclined position in alignment with an inclined off-bearing discharge conveyor section 5.

Conveyor section 3 is preferably driven continuously to move in the direction of the arrow, as shown in FIGURE 1. In the embodiment illustrated, this is accomplished by a motor and speed reduced drive 6, through appropriate chain and sprocket or belt and pulley drives 7 and 8 which impart motion to a roll 9 over which is trained an endless belt (or belts) 10 which is arranged to engage the rollers 11 of the conveyor section 3 and drive the same in the manner conventional in this type of roller conveyor. Suitable belt-supporting rollers or bars 12 are provided intermediate each adjacent pair of rollers 11, as shown in the drawing, to hold the belt 10 in proper driving position with respect to the rollers 11.

The rollers 13 of the conveyor section 5 are similarly driven through motor and speed reducer 14 and a drive chain or belt 15 which impart motion to a roll 16 over which is trained endless belt (or belts) 17. Belt 17 engages the under surface of the rollers 13 and is held in proper position by bars or rollers 18 positioned intermediate adjacent pairs of conveyor rollers 13.

It will be noted that the belt 17 extends into the zone of operation of tilting conveyor section 4 and that rolls 19 are positioned to support the belt in driving engagement with rollers 20 of the tilting conveyor section 4 when the same is moved to its downwardly inclined article-delivery position. With this arrangement, the rollers 20 of the tilting conveyor section 4 roll freely to receive an article delivered thereon from inclined conveyor section 3, and the rollers 20 are driven to discharge the article from the tilting conveyor section 4 and onto discharge conveyor section 5 upon tilting movement of the conveyor section 4 to discharge position. In such discharge position, conveyor section 4 serves as a continuation of discharge conveyor section 5, being driven by the same belt and driving arrangement.

The rollers of tilting conveyor section 2 are arranged for movement in two directions. They move in an infeed direction when the conveyor is in a horizontal position, as shown in FIGURE 1, and during tilting movement. Movement of the conveyor in this direction serves to hold the article being conveyed against premature downward movement during tilting motion of the conveyor section. The rollers move in an outfeed direction upon alignment of the conveyor sections 2 and 3.

The tilting conveyor section 2 is driven by a reversible motor and reduction drive 21 and an appropriate chain and sprocket or belt and pulley drive 22. A chain 23 is trained over sprockets 24 mounted on the ends of each of the rollers 25 of the conveyor section 2 and imparts motion to the rollers 25 in unison in either a forward or reverse direction upon appropriate rotation of the motor 21.

An infeed conveyor section 26 may be provided for delivering articles to the tilting conveyor section 2. This may be driven continuously in the direction of the arrow shown in FIGURE 1 by the drive unit 6.

A dead roller conveyor section 27 may be provided at the end of the inclined delivery conveyor section 5 to receive articles thereon for inspection and delivery to a further operating station.

As previously mentioned, conveyor section 2 is arranged for tilting motion, and such motion may be imparted by an air or hydraulic cylinder and piston unit 28, the cylinder being pivoted to the floor or to the frame of the machine and the piston being pivoted to the conveyor section, as shown in FIGURES 1 and 2. A stop 29 is provided to arrest the forward movement of any article moving along conveyor 26 during tilting movement of conveyor section 2. The stop is so positioned that it does not impede free movement of an article when the conveyor sections 2 and 26 are aligned as shown in FIGURE 1 but arrests the movement of any article on conveyor section 26 when the conveyors are in partial or fully tilted position, as shown in FIGURE 2.

A similar tilting arrangement is provided for conveyor section 4. The air or hydraulic cylinder and piston unit 30 for this tilting conveyor section 4 is pivoted to the frame of the machine and to the conveyor section 4, and a stop arrangement 31 similar to the stop 29 on conveyor section 2 is provided to arrest the movement of any article traveling along the lower end of conveyor section 3, during tilting movement of conveyor section 4 and until the sections 3 and 4 are properly aligned for delivery of the article onto conveyor section 4, as shown in FIGURE 1.

Automatic operation of the drive for tilting conveyor section 2 and the air cylinder and piston units 28 and 30 may be provided. In the embodiment shown, the board 32 is being fed in the direction of the arrow. A limit switch 33 (FIGURE 2) is secured to the frame of infeed conveyor section 26 in a position to be engaged by the tilting conveyor section 2; and upon movement of the conveyor 2 from the position shown in FIGURE 2 to that shown in FIGURE 1, the switch 33 is actuated. Limit switch 33 is one of a pair of reversing switches which control reversible motor 21 which drives the rollers 25 of conveyor section 2. When conveyor section 2 is in the position shown in FIGURE 1, conveyor rollers 25 are placed in rotation to move the board onto the conveyor section 2. When the oncoming board 32 moves into engagement with a limit switch 34 positioned at the end of the conveyor section 2 and having its actuating member positioned in the path of movement of the board 32, air or hydraulic fluid is supplied to cylinder and piston unit 28 to lower the conveyor section 2 into alignment with section 3, as shown in FIGURE 2.

As the conveyor section 2 moves to its lowered position, it engages the actuating member of limit switch 35 which stops motor 21. When conveyor section 2 reaches its lowered position in alignment with conveyor section 3, as shown in FIGURE 2, the conveyor engages the actuating member on reversing limit switch 36; this reverses the rotation of motor 21, and rollers 25 are driven in the direction shown in the arrow in FIGURE 2 to deliver the board 32 from conveyor section 2 onto section 3. As this movement of the board 32 occurs, limit switch 37 is tripped; this switch is wired in series with a limit switch 38 positioned as shown in FIGURE 1. When the board 32 reaches the actuating member of switch 38 and trips the same, the board will have cleared switch 37, and tripping of switch 38 will result in reversing of the direction of movement of the piston in air cylinder unit 28, returning the conveyor section 2 to its elevated position, as shown in FIGURE 1. By providing a pair of limit switches 37 and 38, should the inclined conveyor section 3 become filled with boards because of failure or interruption in the operation of a subsequent operating station to which the boards are delivered from the conveyor system, a suitable signal may be initiated, and damage to the boards will not occur through inadvertent operation of the tilting conveyor section 2.

The board 32 moves down conveyor section 3 and onto tilting conveyor section 4 until it comes into engagement with the actuating arm of limit switch 39 which controls the supply of air to cylinder and piston unit 30 which tilts the conveyor section 4 to its lowered position in alignment with conveyor section 5. When the rollers 20 of the conveyor section 4 are brought into engagement with the belt 17, the rollers are driven to move the board 32 onto the conveyor section 5. When conveyor section 4 reaches its proper position in alignment with conveyor section 5, limit switch 40 is actuated which controls the supply of air to cylinder and piston unit 30 to hold the conveyor section 4 in its lowered position.

A limit switch 41 is provided which has its actuating member lying in the path of movement of the board 32 from conveyor section 4 onto conveyor section 5, and this limit switch is effective for controlling the supply of air to cylinder and piston unit 30 to return the conveyor section 4 to its normal position, as shown in FIGURE 1, after passage of the board onto the conveyor section 5.

If desired, a pair of limit switches 42 and 43 wired in series may be provided on the conveyor section 26 to interrupt the supply of boards thereto, shut down a prior operating station such as the dielectric drier previously mentioned, or to indicate or initiate an appropriate signal when two boards are positioned on conveyor section 26, one in engagement with switch 42 and the other in engagement with switch 43. This will obviate damage to boards which might otherwise pile up on conveyor 26 or might be damaged in a prior operating station.

The wiring of the limit switches and the piping for the air or hydraulic fluid for the cylinder and piston units are conventional and, accordingly, have not been illustrated in the drawing.

I claim:

1. A delivery conveyor system comprising a tiltable conveyor section pivoted to move from an article-receiving position to an inclined article-delivering position, an off-bearing conveyor section aligned with said tiltable conveyor section when said tiltable conveyor section is in said article-delivering position, means for tilting said tiltable conveyor from said article-receiving position to said article-delivering position, means for driving said tiltable conveyor section in an infeed direction to infeed an article into position thereon and for continuing to drive said tiltable conveyor section in said infeed direction during said tilting movement of said tiltable conveyor section from said article-receiving position to said article-delivering position to hold said article against movement by gravity along said tiltable conveyor section during said tilting movement, article-arresting means positioned on said tiltable conveyor section in the path of movement of said article, and means for reversing said driving means for said tiltable conveyor section to drive the same in an outfeed direction to outfeed said article from said tiltable conveyor section onto said off-bearing conveyor section upon movement of said tiltable conveyor section to said inclined article-delivering position.

2. A delivery conveyor system comprising a tiltable conveyor section pivoted to move from a substantially horizontal infeed position to an inclined outfeed position, an off-bearing conveyor section aligned with said tiltable conveyor section when said tiltable conveyor section is in said inclined outfeed position, means for driving said tiltable conveyor section in an infeed direction to infeed an article into position thereon and for continuing to drive said tiltable conveyor section in said infeed direction during tilting movement of said tiltable conveyor section from said article-receiving position to said article-delivering position to hold said article against movement by gravity along said tiltable conveyor section during said tilting movement, article-arresting means positioned on said tiltable conveyor section in the infeed path of movement of said article, means controlled by movement of said article on said tiltable conveyor section to a predetermined infeed position thereon for tilting said tiltable conveyor section from said substantially horizontal position to said inclined position, and means controlled by tilting motion of said tiltable conveyor section from said substantially horizontal position to said inclined position for reversing the direction of movement of said driving means for said tiltable conveyor to drive the same in an outfeed direction to outfeed said article from said tiltable conveyor section onto said off-bearing conveyor upon movement of said tiltable conveyor section to said inclined position.

References Cited in the file of this patent

UNITED STATES PATENTS

| 499,460 | Hooper | June 13, 1893 |
| 562,534 | Hollingsworth | June 23, 1896 |
| 2,675,118 | Morrison | Apr. 13, 1954 |
| 2,700,449 | Gleason et al. | Jan. 25, 1955 |

FOREIGN PATENTS

| 1,099,053 | France | Mar. 16, 1955 |